Sept. 2, 1958
H. McC. OTTO
2,849,921
GATLING GUN
Filed April 2, 1954
8 Sheets-Sheet 1
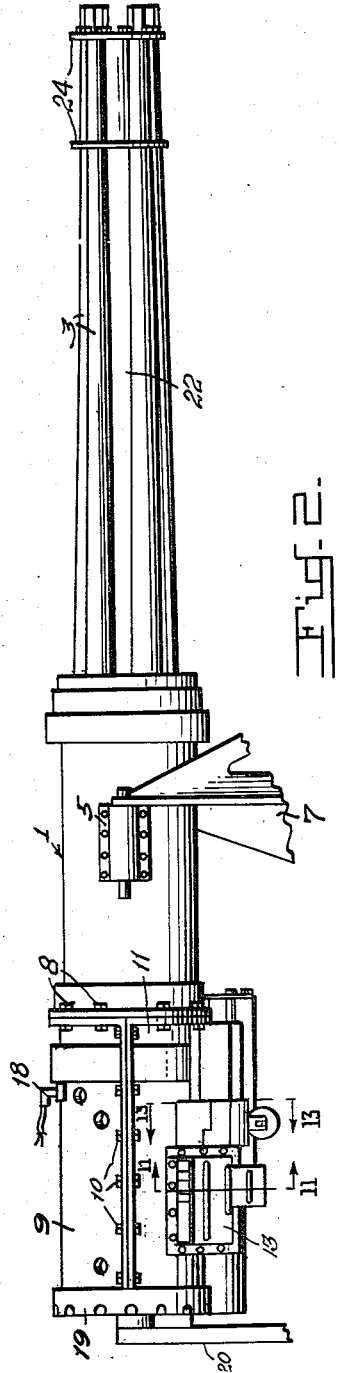
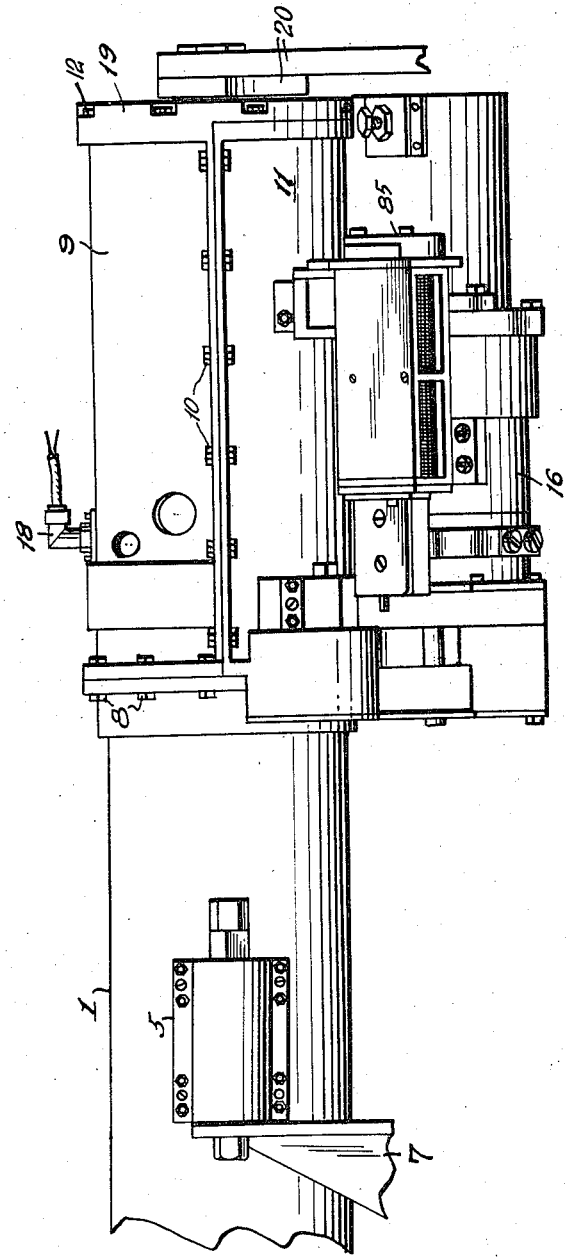
INVENTOR.
H.M. Otto deceased by,
Wesley. W. Taber, Executor
By: W.E. Thibodeau, A.W. Dew
and D. P. Smith
ATTORNEYS.

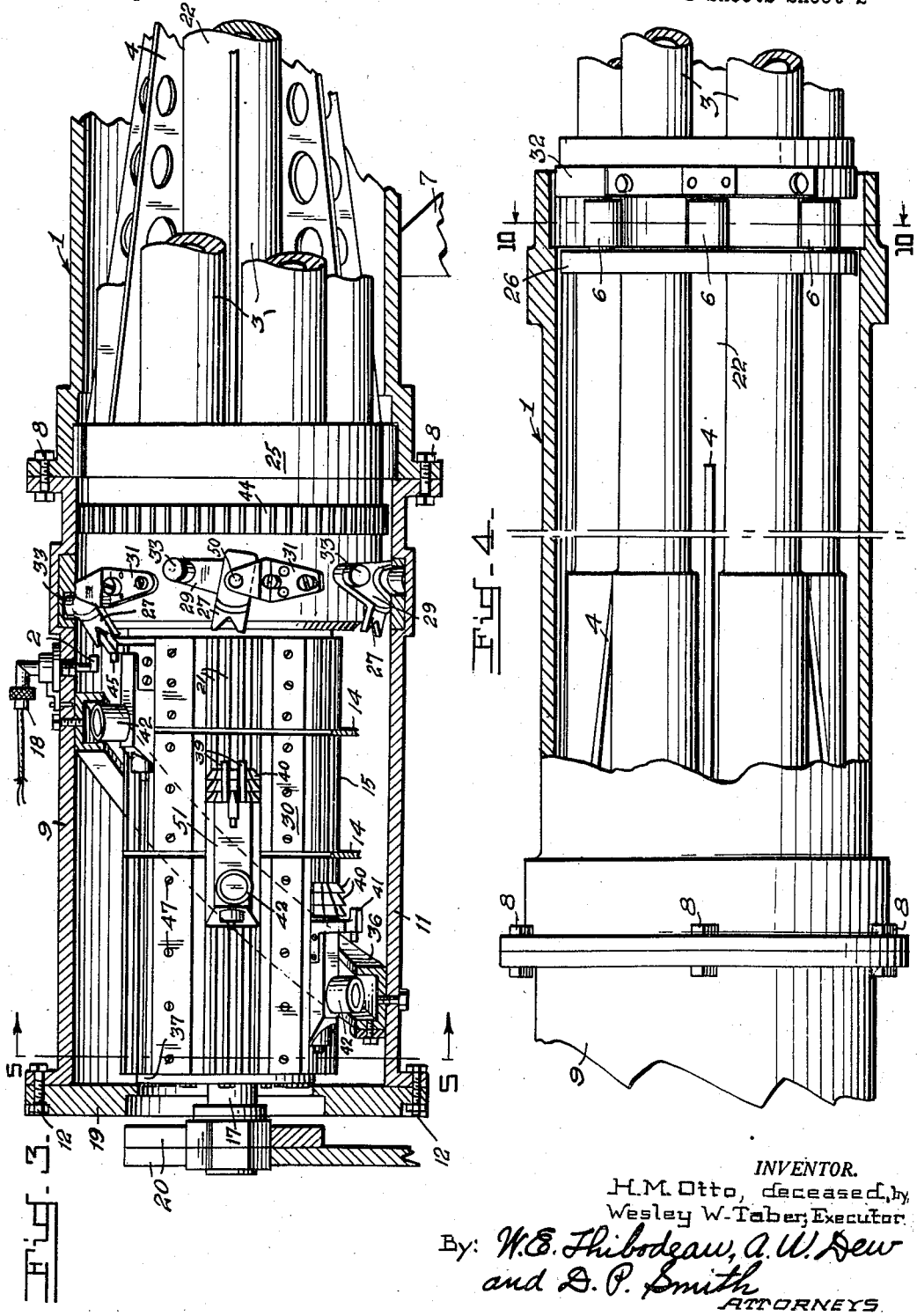

Sept. 2, 1958  H. McC. OTTO  2,849,921
GATLING GUN

Filed April 2, 1954  8 Sheets-Sheet 3

INVENTOR.
H.M. Otto, deceased, by,
wesley w. Taber, Executor.
By: W. E. Thibodeau, A. W. Pew
and D. P. Smith
Attorneys.

Sept. 2, 1958      H. McC. OTTO      2,849,921
GATLING GUN
Filed April 2, 1954      8 Sheets-Sheet 5
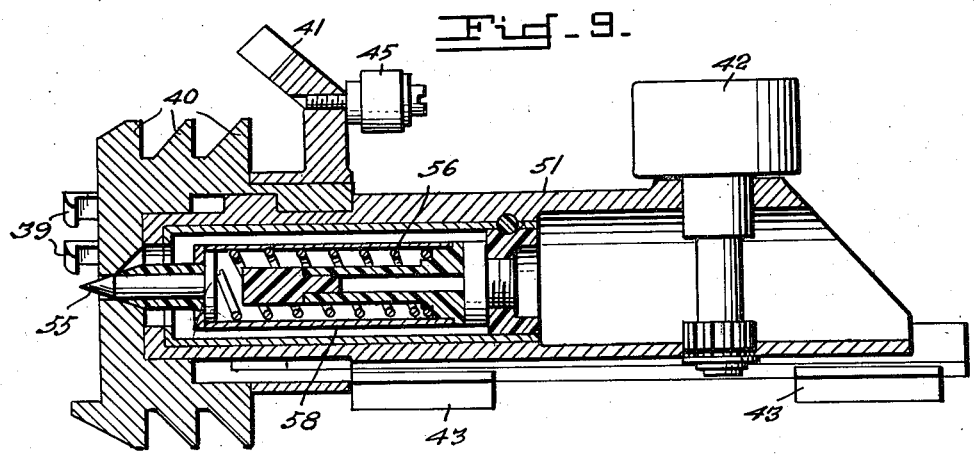
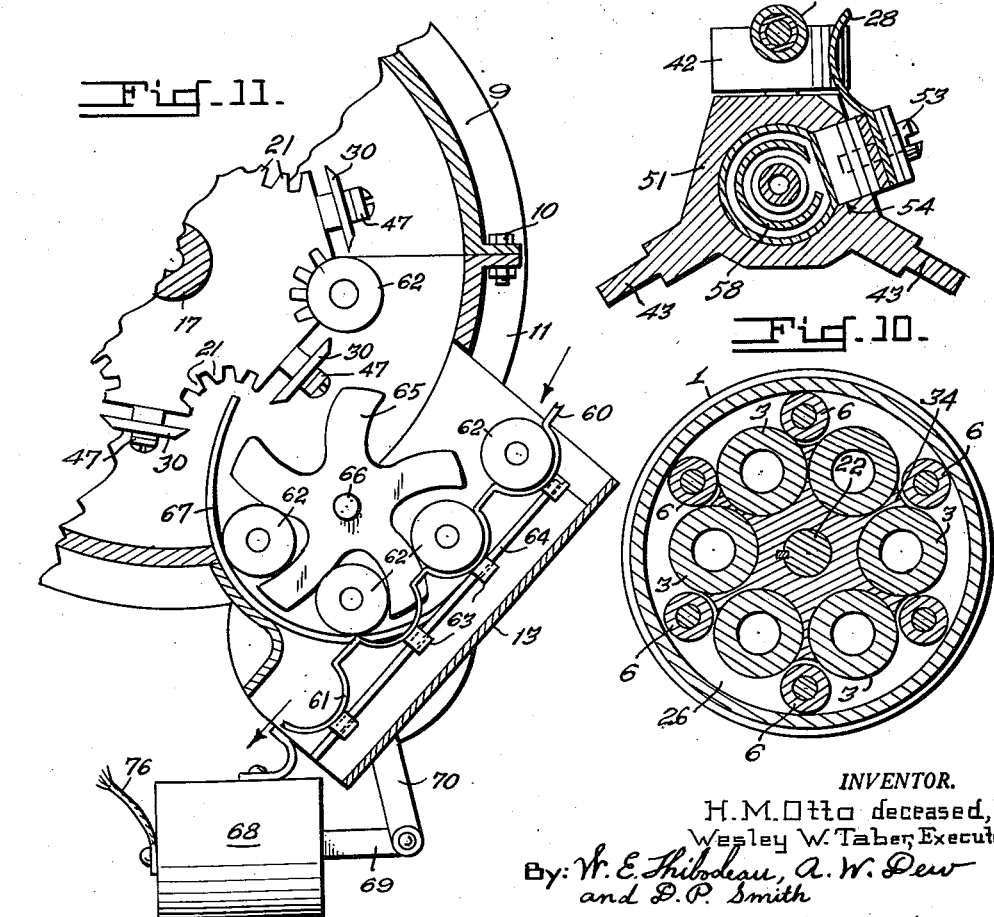
INVENTOR.
H. M. Otto deceased, by
Wesley W. Taber, Executor
By: W. E. Thibodeau, A. W. Dew
and D. P. Smith
Attorneys.

Sept. 2, 1958 H. McC. OTTO 2,849,921
GATLING GUN
Filed April 2, 1954 8 Sheets-Sheet 6
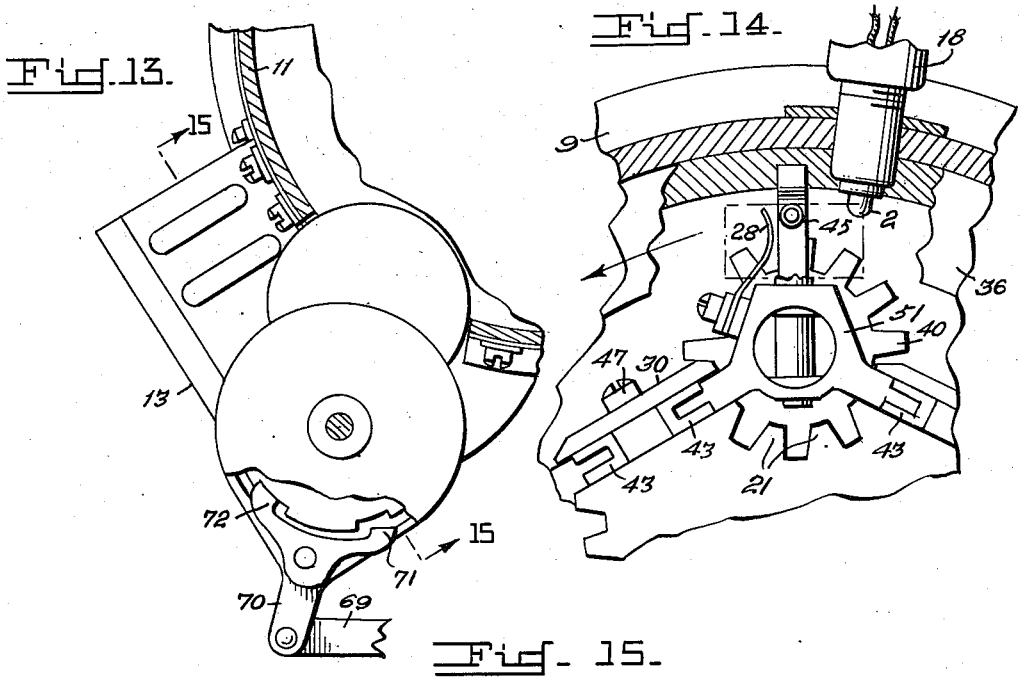
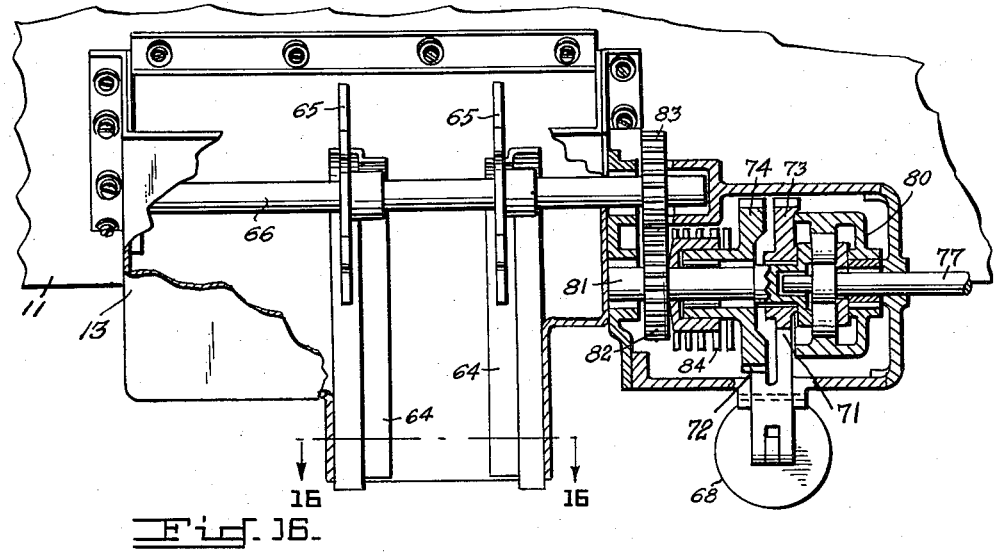
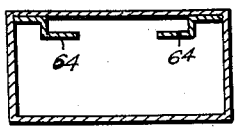
INVENTOR.
H. M. Otto, deceased, by
Wesley W. Taber, Executor
By: W. E. Thibodeau, A. W. Pew
and D. P. Smith
Attorneys.

Sept. 2, 1958 H. McC. OTTO 2,849,921
GATLING GUN
Filed April 2, 1954 8 Sheets-Sheet 7

INVENTOR.
H. M. Otto, deceased, by,
Wesley W. Taber, Executor.
By: W. E. Thibodeau, A. W. Pew
and P. P. Smith
Attorneys.

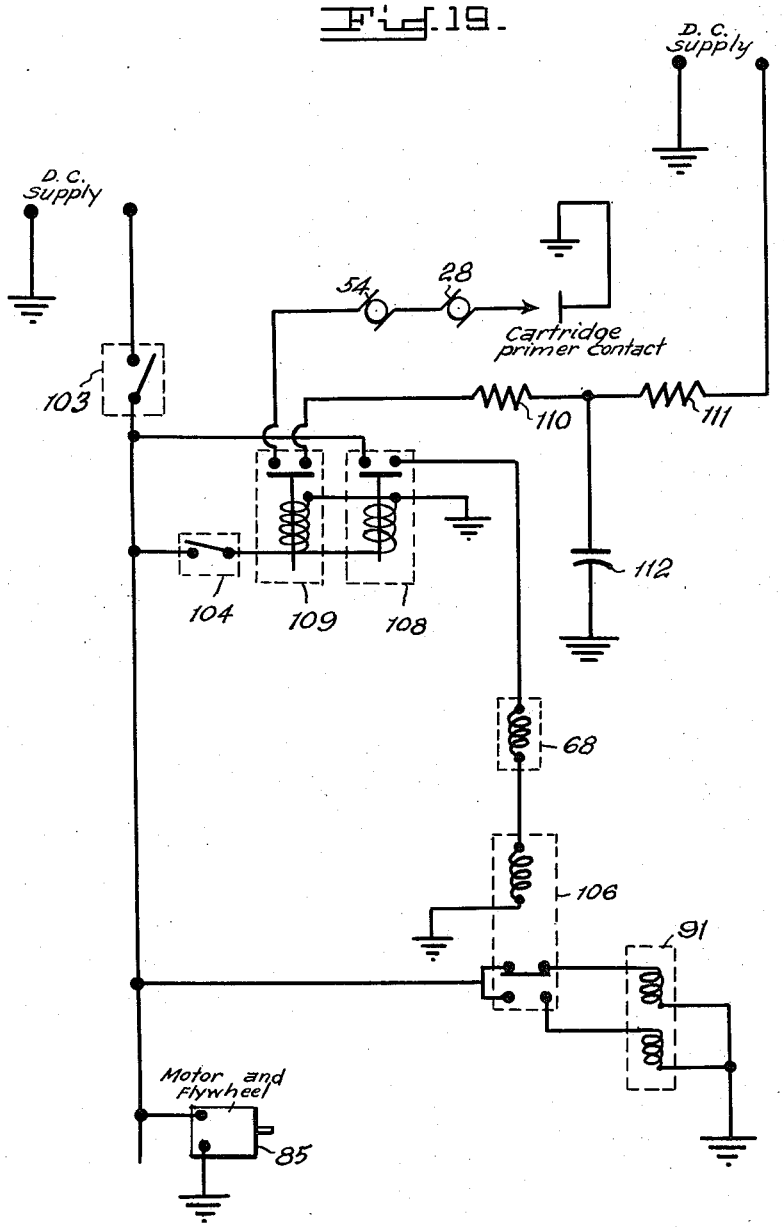

United States Patent Office 2,849,921
Patented Sept. 2, 1958

2,849,921

GATLING GUN

Harold McCall Otto, deceased, late of Schenectady, N. Y., by the Schenectady Trust Company, executor, Schenectady, N. Y., assignor to the United States of America as represented by the Secretary of the Army Application April 2, 1954, Serial No. 420,760

7 Claims. (Cl. 89—12)

The invention relates to an improvement in the construction of guns and particularly to that type of machine gun or firearm in which a plurality of barrels are arranged for rotation as a cluster around a common axis and provided with a suitable mechanism for feeding cartridges thereto. Specifically the invention is directed toward the discharge of the barrels in sequence in a predetermined position and the use of an electric motor as the means of revolving the barrels and feeding the rounds to thereby present the next barrel in the predetermined sequence in firing position.

It is accordingly a broad object of the invention to improve on the automatic guns now in use.

A still further object of the invention is to provide a multi-barrel gun having a rotatable body member and a plurality of cams which cooperate to positively present electrically fired rounds into firing position.

Other objects and advantages will appear in the following specification in which:

Figure 1 is a longitudinal elevation of the gun shown in firing position.

Figure 2 is an enlarged longitudinal elevation of a part of the gun of Figure 1.

Figure 3 is a longitudinal elevation in section of a part of the gun showing the loading mechanism.

Figure 4 is a fragmentary longitudinal section view showing the barrel cluster.

Figure 9 is a longitudinal elevation in section of the member of Figure 8.

Figure 10 is a view taken on lines 10—10 of Figure 4 and looking in the direction of the arrows.

Figure 11 is a view taken on lines 11—11 of Figure 1 and looking in the direction of the arrows.

Figure 12 is a view taken on lines 12—12 of Figure 8 and looking in the direction of the arrows.

Figure 13 is a view taken on lines 13—13 of Figure 1 and looking in the direction of the arrows.

Figure 14 is an enlarged view taken on lines 14—14 of Figure 6.

Figure 15 is a view taken on lines 15—15 of Figure 13 and looking in the direction of the arrows.

Figure 16 is a view taken on lines 16—16 of Figure 15 and looking in the direction of the arrows.

Figure 19 is a schematic wiring diagram showing the control circuit for the gun.

Figure 5:
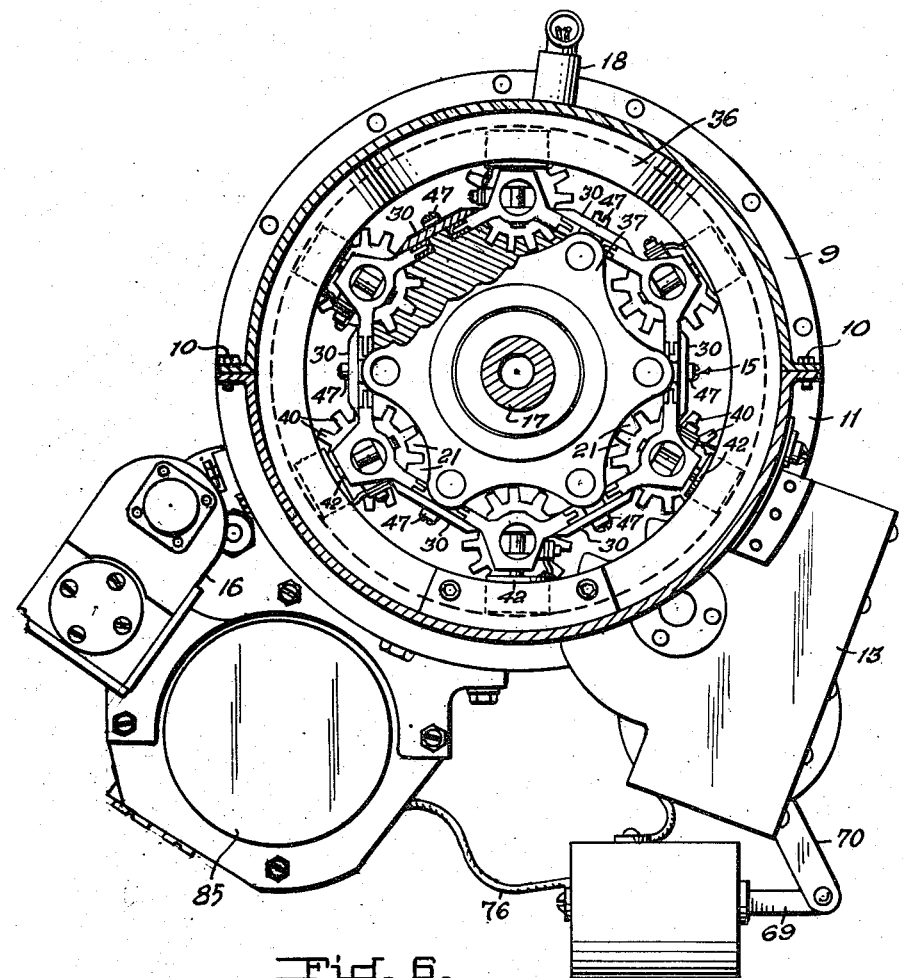
Figure 5 is a view taken on lines 5—5 of Figure 3 and looking in the direction of the arrows.
Figure 6:
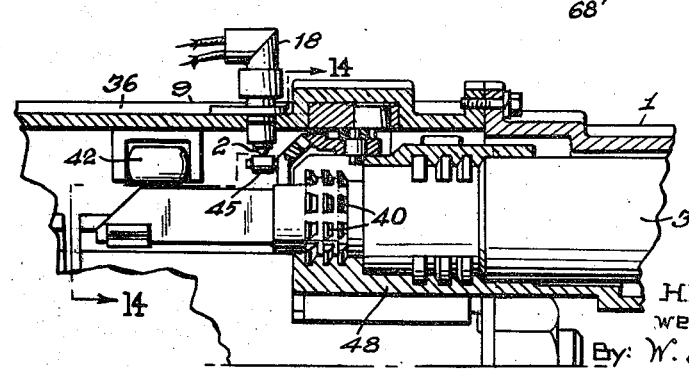
Figure 6 is an enlarged fragmentary detail view of the cartridge ramming and firing structure.

Referring now to the drawings wherein similar parts are designated by similar reference characters, 1 indicates generally a cylindrical casing covering the breech end of the barrels 3 and carrying trunnions 5 for supporting the gun on a suitable cradle 7, and secured by bolts 8 to one end of a two part housing designated by reference characters 9 and 11 having the ends thereof bent into flanges and secured together by bolts 10. The other end of the casing formed by the joined parts is closed by an end bell 19 secured by bolts 12 and adapted to be pierced by a shaft 17 carried by supporting plates 20 for a purpose that will presently be explained. A cartridge stripping and feeding mechanism 13 is secured to the lower sector of the casing and a motor and clutch assembly 16 is secured to such sector and radially displaced from the stripping mechanism as can best be seen by reference to Figure 5.

A supporting shaft 22 holds the barrels against whip during firing and is disposed at the axis of the barrel cluster and terminates in a perforated disc 25 pierced by the barrels. A plurality of plates 4 radiate outwardly from the shaft and lie in planes between successive barrels. The shaft is received at one end thereof within the cylindrical casing 1 and acts to support barrel spool 24 at the other end.

A roller bearing, as best seen in Figures 4 and 10, supports the barrel cluster for rotation and comprises two concentric spaced plates 26 and 32 journaling therebetween rollers 6 adapted to ride on the inner surface of casing 1 and having a built up spider 34 secured to the spaced plates, snugly engaging the several barrels 3 and keyed to shaft 22 as best seen in Figure 10. The barrel assembly is thereby supported for rotation at high speed and is held against whip during discharge cycles.

A rotatable cylindrical body 15 is mounted within the cavity formed by members 9 and 11 and is fixed for rotation at one end to shaft 17 and is secured by bolts (not shown) to perforated disc 25 at the other end thereof. A star plate 37 is secured to the end of the body, substantially as shown, and groove guides 21 equal in number to the number of barrels are cut into the member and terminate in respective chambers 23 formed in an enlarged head portion 48, such chambers being provided with peripheral interrupted threads (not shown). The barrels 3 are adapted to be threaded into the head portion 48 in axial alignment with the chambers, and table plates 30 are fastened between successive longitudinal guides by bolts 47 and are arranged to extend in part thereover as can be seen in Figures 3 and 5. Radially aligned with each cavity is a bell crank having a bifurcated leg 27 and a leg 29 carrying boss 33. Angles 31 are secured to head portion 48 and are depended upon to provide the pivot 50 for each crank. A ring gear 44 is formed on the head portion substantially as shown.

Figure 8:
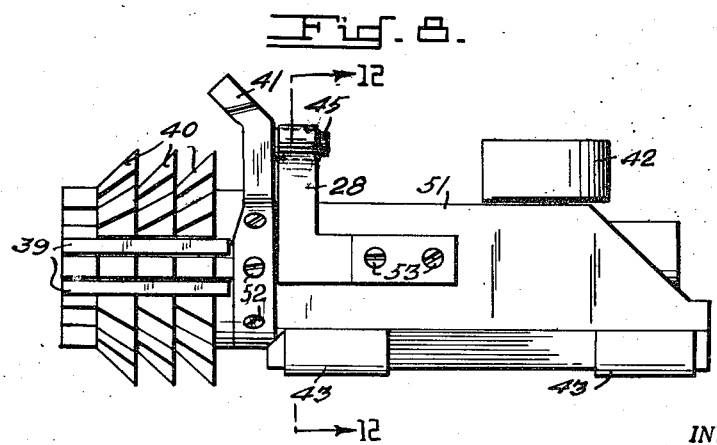
Figure 8 is an enlarged longitudinal elevation of a slidable cartridge carrying member.

A plurality of slide members 51 each having a cam follower 42 thereon are carried for motion in the several groove guides. Such members are illustrated in enlarged detail in Figures 8, 9, and 12 wherein reference character 43 denotes feet adapted to ride in the trough formed under table plates 30. The forward part of the body or breech lock means is rotatable with respect to the rearward portion and carries spring clip 39 to grip and guide a cartridge and interrupted threads 40 to cooperate with the beforementioned threads formed within the chambers.

A finger 41 having a spur contact 45 protruding therefrom is fastened to the rotatable forward portion of the body by bolts 52 and is arranged to cooperate with the beforementioned bifurcated finger 27 as will later be more fully explained. A contact 28 is held to the rearward non-rotatable portion of the body by bolts 53 and is positioned to be engaged by spur contact 45 when the forward portion of the body is rotated. An interlock contact 54 is held by the bolts 53 and has a head extending within the body portion as seen in Figure 12. The firing pin 55 is electrically insulated from the slide member body and has a compression spring 56 urging against the firing pin head 57. Sleeve 58 serves to contain the spring and pin assembly and has a portion thereof cut away as seen in Figure 12 whereby rotation of the forward portion of the slide member will cause the sleeve to rotate therewith and to engage against interlock contact 54. A main contact 18 is mounted on the top of member 9 and is connected to a source of electrical energy and to a contact 2 to be engaged by spur contacts 45 in firing position.

Figure 7:
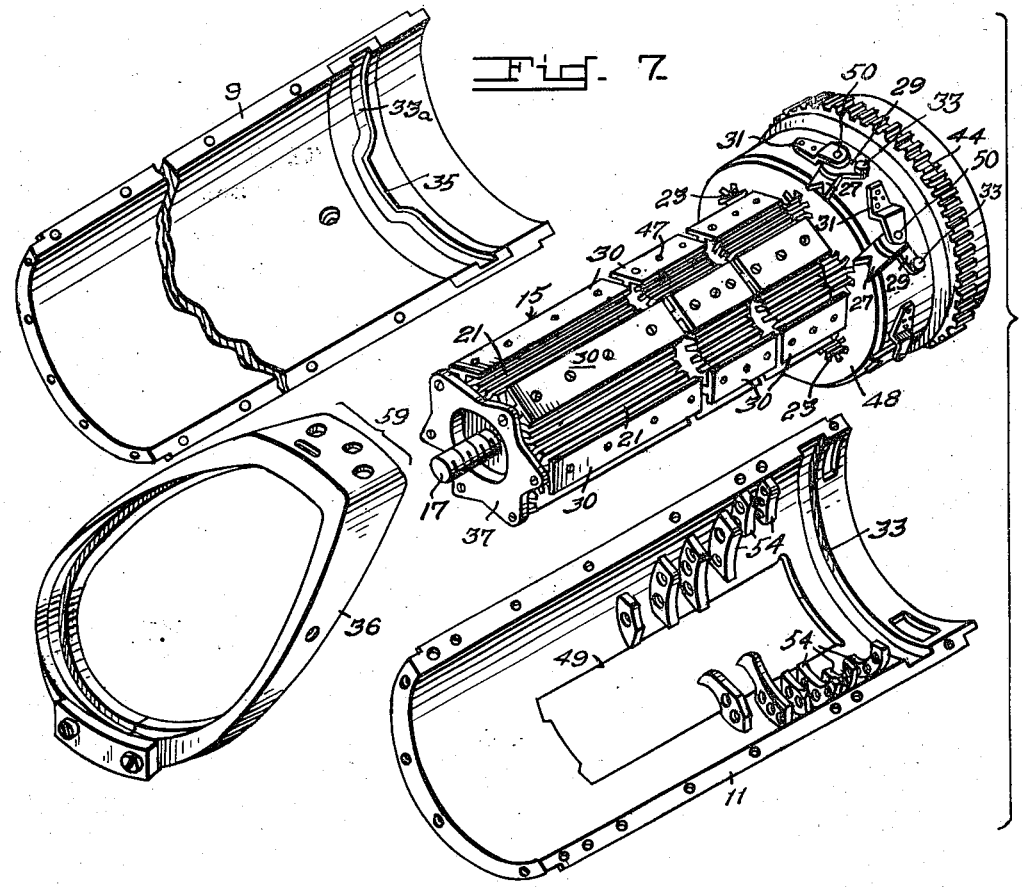
Figure 7 is an exploded view of the receiver of the novel weapon.

A main cam 36 susbstantially U-shaped in cross section, is secured to the inner periphery of the joined members 9 and 10 and surrounds the beforementioned rotatable body member to lie in a plane forming an acute angle with the axis of the rotatable body. The cam has a dwell portion corresponding to the barrel firing position as indicated by reference character 59 in Figure 7 which lies in a plane forming a right angle with the axis of the rotatable body. The cam followers 42 of the several slide members are received within the cam, as shown in Figure 3, and it will be readily seen that rotation of body 15 will cause reciprocation of the slide members toward and away from the respective chambers formed in the enlarged head portion. It will be further seen that a cam follower when riding in the dwell portion will have no relative translation with respect to the rotatable body.

Guides 54 are formed on the inner surface of housing member 11 to guide cartridges toward and away from the barrels.

A groove cam 33a is cut into the interior of the members 9 and 11 and has a portion thereof 35, formed in member 9, and corresponding to the barrel firing position wherein the cam runs longitudinally displaced from its normal path. The several bosses 33 carried by the bell cranks are received within such groove cam and a rocking motion is imparted thereto when carried into and out of the dwell portion by rotation of the body 15.

The operation of the mechanical structure of the weapon thus far described is as follows. When the motor and cartridge feeding mechanism are operating, as will be later explained, the rotatable body 15 revolves at high speed carrying the barrel cluster therewith. Since the slidable members each have a cam follower 42 received in main cam 36, which is disposed at an angle to the axis of rotation, the members are translated toward their respective cavities when approaching the firing position at the top of travel and are translated away from their cavities when receding from firing position. Cartridges are presented, in turn, in front of the slidable members and the individual cartridge moves forward and upward therewith past guide members 54 into its cavity and is pushed into the barrel when the follower enters cam dwell portion 59. Meanwhile the bell crank boss 33 rides within cam groove 33a and holds bifurcated leg 27 in a position to receive finger 41. As the slidable member enters the cavity the cartridge is rammed into firing position in the barrel, which action causes fingers 39 to grasp the cartridge case and forces the firing pin against the primer. Simultaneously the boss 33 enters the longitudinally displaced portion 35 and the crank is rotated clockwise to revolve the recoil lock of the slidable member and the interrupted threads engage to lock the member for firing. The interlock contact 54 is closed by the rotation of the slidable member and when spur contact 45 engages contactor 2 the cartridge is fired. The shock of recoil is taken by the interlocking teeth and transmitted to the frame.

After discharge, continued rotation of the body moves boss 33 away from portion 35 of the groove cam and the bell crank rotates counterclockwise to unlock the interrupted threads. As the cam follower 42 leaves the dwell portion 59 the slidable member is drawn rearwardly carrying the spent cartridge past guides 54 to engage a guide 67 on the cartridge feeder mechanism which disengages the same and, it is dropped through opening 49 in casing 11.

The cartridge stripping and feeding mechanism is best illustrated in Figures 11, 13 and 15 wherein reference character 60 designates an ammunition belt comprising links 61 for holding electrically fired cartridges 62 and having angles 63 formed thereon to ride under a rail 64 for guiding the same through the housing. Sprocket wheel 65 is mounted for rotation on shaft 66 journaled in casing 13 and is rotatable by structure to be presently described, to remove the cartridges in succession and carry them around past arcuate guide 67 to present them in front of the slidable members as they move forward toward firing position. A solenoid 68 is energized via leads 76 to oscillate arms 69 and 70 to thereby rock a pivotable dog having teeth 71 and 72 disposed in separate planes to engage notches in rotatable discs 73 and 74. A shaft 77 receives power from the main motor through a spur gear (not shown) mating with ring gear 44 and carries sun gear 78 to engage planet gears 79 journaled in cage 80. Such cage is formed integral with shaft 81 which carries spur gear 82 to rotate gear 83 and shaft 66. Outer cage 75 has a ring gear on the inner periphery thereof to engage planet gears 79 and is secured to disc 73. Disc 74 is secured to one end of a torsion spring 84 the other end of which is fastened to shaft 81. When it is desired to feed cartridges, and shaft 77 is rotating, the tooth 71 is engaged with disc 73, by action of the solenoid, thus holding the disc and the outer cage 75 stationary. Shaft 77 now turns the sun gear 78, and planet gears 79 revolve around within cage 75 to turn cage 80 and shaft 81 whereby the sprocket 65 performs its feeding function. When it is desired to stop feeding cartridges then the solenoid is actuated to disengage tooth 71 from disc 73 and engage tooth 72 with disc 74 whereby the outer cage 75 now rotates and the driving engagement is removed from shaft 81. Simultaneously, the stoppage of disc 74 causes shaft 81 to wind up against the braking effort of torsion spring 84 thus rapidly stopping the shaft. Figure 16 shows the exit port for the discharge of the empty links from the bottom of casing 13.

Figure 17:
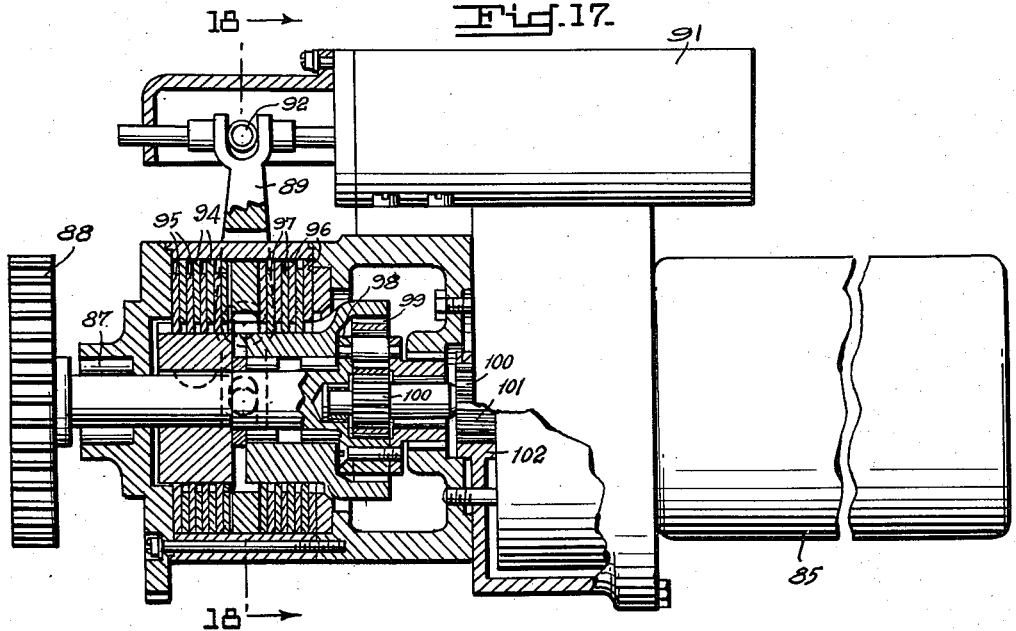
Figure 17 is an enlarged detail view partly in section showing the gun drive unit.
Figure 18:
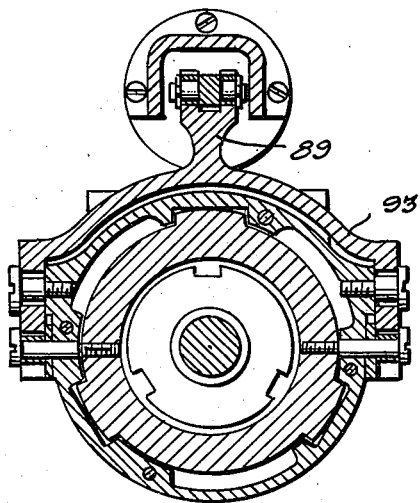
Figure 18 is a view taken on lines 18—18 of Figure 17 and looking in the direction of the arrows.

The main drive motor together with the brake and clutch for the gun is illustrated in Figures 17 and 18 wherein reference character 85 indicates a high torque motor having a flywheel 86 mounted for rotation on its shaft. The main output shaft 87 has a spur gear 88 keyed thereto to drive the ring gear 44 on the rotatable body. The clutch is shifted by a lever 89 which is pivotally mounted to transmit a clutch shifting force from a double position solenoid 91 through a solenoid armature pin 92. The solenoid 91 has two windings for reversible operation.

A clutch ring 93 is connected to the armature pin 92 and is slidable on output shaft 87. If the ring is moved to the left the clutch discs 94 which are secured to the stationary clutch housing are engaged with clutch discs 95 which are keyed to output shaft 87 and the shaft is stopped. If the clutch ring be moved to the right then clutch discs 96 are engaged with rotatable discs 97 which are keyed to a sleeve member 98 and include an internal ring gear 99 to thereby hold the ring gear in a stationary position. Torque is thus applied from the motor and flywheel through sun gear 100 and planet gears 101 to a cage 102. Since this cage is formed integral with output shaft 87 the rotatable member is driven through the beforementioned gear 44. When the clutch ring is moved to the left to brake the shaft the cage 102 is released and drive is removed from the output shaft while the motor continues to rotate.

The electrical control system for the weapon is shown in Figure 19. Reference character 103 indicates an action switch adapted to be closed when it is desired to ready the gun for use. Closing such switch energizes one contact of trigger switch 104 and starts the motor 85 whereupon kinetic energy is built up in the flywheel thereof.

At the same time the upper contacts of relay 106 connect energy to the brake of solenoid 91 and the gun is ready to fire. When trigger switch 104 is closed relay 108 closes, thus opening the upper contacts of relay 106 and bridging the lower ones and actuating the cartridge feed solenoid 68. This releases the brake solenoid and energizes the clutch solenoid whereby the rotatable body is driven and cartridges are fed thereto. Simultaneously, relay 109 closes and a 350 volt source of D. C. electrical energy is connected to interlock switches 54 and 28 which are mounted on the slidable member as previously discussed. When both interlocks have closed electrical energy will pass through the cartridge primer to ground and the gun will fire. A T filter, comprising resistors 110 and 111 connected in series and capacitor 112 connecting the junction of the resistors to ground, is provided to avoid undue arcing at the contacts under conditions of high speed firing and for energy storage. Relay 109 has a time delay on drop out so that when the trigger switch is released the gun rotor is braked at once but the firing circuit is not opened until the rotor stops thus permitting all positioned cartridges to fire.

As discussed above this invention refers to a firearm in which the cluster of barrels revolves about a common axis to present successive barrels in a predetermined position for discharge thereof. Therefore as a barrel is discharged it continues to move in an arcuate path and the impact pattern is displaced slightly from the boresight position. This displacement is a function of barrel angular velocity and the characteristics of the ammunition being fired. It is made up of two components, (1) displacement caused by the velocity of the projectile tangent to the pitch line of the barrels produced by the lateral velocity of the barrels and thereby perpendicular to the usual flight path of the projectile and, (2) displacement of the point of projectile emergence from the point of boresight due to barrel rotation during the time delay between primer ignition and emergence. To minimize the displacement of the pattern the weapon is constructed with converging barrels such that the barrel center lines generate a cone when rotated whose axis is the axis of rotation. Thus at any time the target is at a range greater than the distance from the barrel muzzle to the point of intersection of the barrel center lines. The components which make up the total displacement will reduce the error between the stationary boresight point and the point of impact.

Tests on the weapon have shown a firing rate of 4000 rounds per minute with a belt speed of 500 feet per minute.

It is desired to be understood that the invention is not confined to the precise details of construction and arrangement as herein set forth as, modifications and variations may be made without departing from the spirit of the invention as defined by the appended claims.

It is claimed:

1. In an automatic gun the combination of a casing, a rotatable body within said casing and supporting a plurality of gun barrels adapted to fire in turn upon rotation to a predetermined position, a plurality of longitudinal guides formed in said body and terminating in respective cavities, a plurality of slide members adapted to ride within the said guides, a cam fixed to said casing and surrounding said body to receive in part at least said slide members and force them longitudinally into firing position within the said cavities, a second cam formed in said casing, a plurality of bell crank members pivotally mounted on said body member and adapted to extend in part at least within said second cam the said bell crank members arranged to lock the said slide members in the respective cavities when in firing position, a motor to drive the said body, a feeder assembly to present rounds to be fired, and electrical means to fire said rounds.

2. In an automatic gun the combination of a casing, a rotatable body within said casing and supporting a plurality of gun barrels adapted to fire in turn upon rotation to a predetermined position, a plurality of longitudinal guides formed in said body and terminating in respective cavities, a plurality of slide members adapted to ride within the said guides, a cam fixed to the said casing and surrounding said body to receive in part at least said slide members and move them into firing position within the said cavities, a second cam formed in said casing, a plurality of bell crank members pivotally mounted on said body member and adapted to extend within said second cam, interrupted threads formed on the said slide members to lock the same in the respective cavities when in firing position, a motor to drive the said body, and a feeder assembly to present rounds in succession to the said slide members.

3. In an automatic gun the combination of a casing, a rotatable body within said casing and supporting a cluster of gun barrels adapted to fire in turn upon rotation to a predetermined position, guides formed in said body and terminating in respective cavities, the number of said guides being equal to the number of said barrels, a plurality of slide members adapted to ride within the said guides, a cam fixed to the said casing and surrounding said body to receive in part at least said slide members, said cam forming an acute angle with the axis of said body whereby rotation of the said body forces the respective slide member into firing position upon presentment of a barrel into the said predetermined position, a second cam formed in said casing, a plurality of bell cranks pivotally mounted on said body member and adapted to extend within said second cam to lock the said slide member in firing position, a motor to drive the said body and a cartridge feeder to present cartridges in succession to the said slide members.

4. In an automatic gun wherein a plurality of barrels are arranged around a common axis in a cluster and rotatable to fire in a predetermined position, the combination comprising a casing, a rotatable body within said casing to receive and support said barrels, said rotatable body provided with a splined portion and a head portion provided with a series of chambers having interrupted internal threads formed therein and in axial alignment with bores in said gun barrels, means for presenting cartridges to said barrels including a series of slide members, said slide members comprising a block, an electric firing pin mounted in said block, a pair of radially extending feet adapted to slide in said splines in said rotatable body, an upstanding forwardly projecting finger integral with said block, a contact spur mounted rearwardly in said finger, an upstanding roller mounted on said block, a rotatable member provided with interrupted threads mounted forwardly of said block, a first cam secured to the inner periphery of said casing and adapted to receive said roller on each of said sliding members, locking means to lock said slide members in said chambers in firing position comprising a plurality of bell crank members pivotally mounted on the outer peripheral surface of said head portion of said rotatable body, said bell cranks including one forked finger and a boss carried by another finger, a second cam formed in the inner peripheral surface of said casing, said first cam having a flattened portion formed thereon to cease movement momentarily of said slide member upon presenting a cartridge to one of said barrels and when said threaded rotatable member on said slide member is received in one of said threaded chambers in firing position, said forked finger of said bell crank receiving said upstanding finger of said slide member upon arrival of said slide member to firing position, said second cam having an offset portion to rotate said threaded member on said slide member in said threaded chamber to lock said slide member thereto and a plurality of electrical contacts so arranged within said casing to contact said spur on each of said slide members to fire said cartridge in said barrels upon electrical excitation of said firing pin in said blocks in said slide members.

5. In an automatic gun as claimed in claim 4, wherein said first cam for moving said cartridge presenting means to and from said chambers comprises a cylindrical channel member, receiving said roller on said sliding member, secured to the inner peripheral surface of said casing, said first cam being disposed at a predetermined angle with respect to the axis of rotation of said gun, said first cam defining a flattened portion along its upper end and having its linear axis disposed at right angles with the longitudinal axis of said gun, to provide a momentary dwell in the longitudinal movement of said sliding member when said sliding member has reached its final position in firing sequence.

6. In an automatic gun, the combination of a casing, a rotatable body within said casing supporting a plurality of gun barrels adapted to fire in turn upon rotation to a predetermined position, a plurality of guides formed in said body and terminating in respective cavities, lock elements within said cavities, a plurality of slide members adapted to ride within said guides, a cam engaging said slide members and adapted to move said slide members longitudinally in said guides in response to rotation of said body, breech lock means mounted on the forward end of said slide members and movable with respect thereto for locking engagement with said lock elements, actuating means engaging said breech lock means and said casing and adapted to move said breech lock means relative to said slide members into locking relation with said lock elements in response to rotary movement of said body to effect sequential locking of said slide members in firing position, said breech lock means transmitting recoil to said body through said lock elements when in firing position, a motor to drive the said body, and a cartridge feeder to present cartridges in succession to the said slide member.

7. In an automatic gun, the combination of a casing, a rotatable body within said casing supporting a plurality of gun barrels adapted to fire in turn upon rotation to a predetermined position, a plurality of guides formed in said body and terminating in respective cavities, lock elements within said cavities, a plurality of slide members adapted to ride within said guides, a cam engaging said slide members and adapted to move said slide members longitudinally in said guides in response to rotation of said body, breech lock means mounted on the forward end of said slide members and rotatable with respect thereto for locking engagement with said lock elements, actuating means engaging said breech lock means and said casing and adapted to rotate said breech lock means relative to said slide members into locking relation with said lock elements in response to rotary movement of said body to effect sequential locking of said slide members in firing position, said breech lock means transmitting recoil to said body through said lock elements when in firing position, a motor to drive the said body, and a cartridge feeder to present cartridges in succession to the said slide member.

References Cited in the file of this patent

UNITED STATES PATENTS

| 502,185 | Gatling | July 25, 1893 |
| 509,091 | McCullough | Nov. 21, 1893 |

FOREIGN PATENTS

| 936,545 | France | July 22, 1948 |